United States Patent
Lee

(10) Patent No.: US 9,131,133 B2
(45) Date of Patent: Sep. 8, 2015

(54) STABILIZED CAMERA MODULE

(75) Inventor: Kiho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 477 days.

(21) Appl. No.: 13/519,489

(22) PCT Filed: Dec. 28, 2010

(86) PCT No.: PCT/KR2010/009449
§ 371 (c)(1),
(2), (4) Date: Aug. 31, 2012

(87) PCT Pub. No.: WO2011/081420
PCT Pub. Date: Jul. 7, 2011

(65) Prior Publication Data
US 2013/0002894 A1 Jan. 3, 2013

(30) Foreign Application Priority Data
Dec. 28, 2009 (KR) .......................... 10-2009-0131910

(51) Int. Cl.
*H04N 5/228* (2006.01)
*H04N 5/225* (2006.01)

(52) U.S. Cl.
CPC .......... *H04N 5/2252* (2013.01); *H04N 5/2257* (2013.01)

(58) Field of Classification Search
USPC ..................................................... 348/208.99
See application file for complete search history.

(56) References Cited

U.S. PATENT DOCUMENTS

| | | | |
|---|---|---|---|
| 2004/0066564 A1 | 4/2004 | DiRisio | |
| 2004/0141232 A1* | 7/2004 | Luthardt et al. | 359/405 |
| 2006/0062559 A1* | 3/2006 | Naka et al. | 396/79 |
| 2006/0245085 A1* | 11/2006 | Lee et al. | 359/813 |
| 2006/0266031 A1* | 11/2006 | Kosaka et al. | 60/527 |
| 2009/0051776 A1 | 2/2009 | Wernersson | |
| 2009/0295986 A1* | 12/2009 | Topliss et al. | 348/374 |

FOREIGN PATENT DOCUMENTS

| | | |
|---|---|---|
| JP | 2003-43332 A | 2/2003 |
| JP | 2004-126587 A | 4/2004 |
| JP | 2006-38891 A | 2/2006 |

* cited by examiner

*Primary Examiner* — Roberto Velez
*Assistant Examiner* — Stephen Coleman
(74) *Attorney, Agent, or Firm* — Birch, Stewart, Kolasch & Birch, LLP

(57) ABSTRACT

The present invention relates to a stabilized camera module configured to prevent instable movement of a bobbin caused by outside force, the module including a holder formed at a lateral surface with at least one slit, a bobbin movably coupled to an inside of the holder and having a protruder protruding outside of the holder by penetrating the slit, a lens assembly coupled to an inside of the bobbin and including one or more lenses receiving an optical image of an object, and one or more elastic members formed between the holder and the bobbin to prevent the bobbin from moving to one side of the holder.

14 Claims, 2 Drawing Sheets

STABILIZED CAMERA MODULE

TECHNICAL FIELD

The present invention relates to a stabilized camera module camera module, and more particularly to a camera module configured to be used for image capturing.

BACKGROUND ART

Generally, digital compact camera modules are currently being incorporated into a variety of host devices. Such host devices include mobile communication devices such as cellular telephones, personal data assistants (PDAs) and smartphones, and other various IT devices. Consumer demand for digital camera modules in host devices continues to grow.

As noted above, mobile communication devices such as mobile phones and PDAs markedly include a camera function using a compact camera module.

A camera module includes an image sensor such as a charge coupled device (CCD) or a complementary metal oxide semiconductor (CMOS), and is manufactured to have a focus adjustment capability for adjusting a size of an image. At this time, the camera module includes a plurality of lenses, a driving source to move each lens, and changes a relative distance therebetween to adjust an optical focal distance.

To be more specific, the camera module includes an image sensor converting an optical signal to an electric signal, lenses collecting light to the image sensor and an IR filter, a housing that houses the image sensor and IR filter and a printed circuit board that processes the signal from the image sensor, where the lenses are connected to an MEMS actuator to adjust a gap of the image sensor, whereby auto focusing function is implemented.

The camera module including a lens assembly can generally maintain a reference point on a floor surface by applying pressure downward using a spring such as a leaf spring. However, the spring may be deformed due to fluctuation of the lens assembly during drop test due to weak strength of the spring, and vibration noise of the spring may be generated due to vibration of a vibration motor caused by low elasticity of the spring itself.

DISCLOSURE OF INVENTION

Technical Problem

The present invention is disclosed to provide a stabilized camera module configured to prevent instable movement of a bobbin caused by outside force.

Technical problems to be solved by the present invention are not restricted to the above-mentioned disclosure, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a stabilized camera module, the camera module characterized by: a holder formed at a lateral surface with at least one slit; a bobbin movably coupled to an inside of the holder and having a protruder protruding outside of the holder by penetrating the slit; a lens assembly coupled to an inside of the bobbin and including one or more lenses receiving an optical image of an object; one or more elastic members formed between the holder and the bobbin to prevent the bobbin from moving to one side of the holder; and an SMA (Shape Memory Alloy) wire shrunken or relaxed based on strength of applied power, and restricting or relaxing the movement of the protruder based on the shrinking and relax, wherein the protruder moves along the slit, and the movement of the protruder is restricted in the same direction as that of restricting the movement of bobbin by the elastic member.

In another general aspect of the present invention, there is provided a stabilized camera module, the module characterized by: a holder; a bobbin movably coupled inside the holder; a lens assembly fixedly coupled inside the bobbin and having one or more lenses receiving an optical image of an object; and one or more elastic members formed between the holder and the bobbin to prevent the bobbin from moving to one side of the holder.

Advantageous Effects of Invention

The stabilized camera module according to the present invention has an advantageous effect in that an instable movement of a bobbin caused by outside force can be prevented during maintenance of initial state to thereby prevent a spring from generating noise and vibration that are caused by deformation of the spring and vibration of a vibration motor.

BRIEF DESCRIPTION OF DRAWINGS

The teachings of the present invention can be readily understood by considering the following detailed description in conjunction with the accompanying drawings, in which.

BEST MODE FOR CARRYING OUT THE INVENTION

Figure 1:
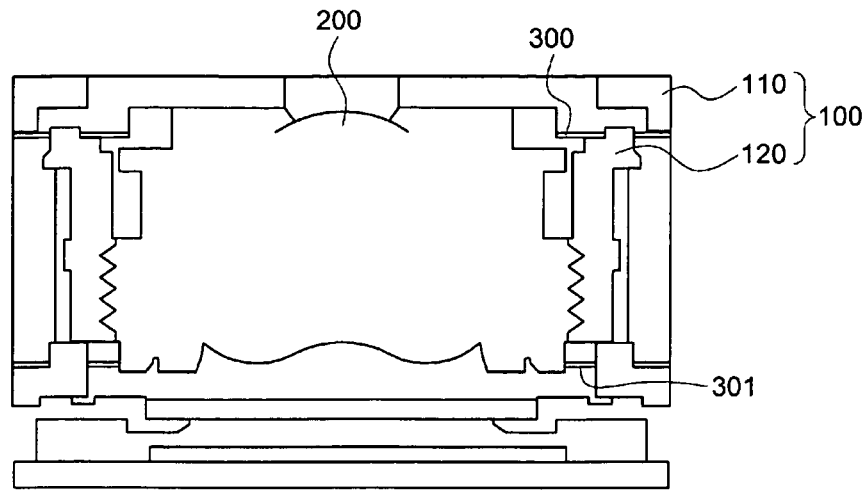
FIG. 1 is a lateral view illustrating a stabilized camera module according to an exemplary embodiment of the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application (s) or use(s) of the present invention.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspects are intended to embrace all such alterations, modifications, and variations that fall within the scope and novel idea of the present invention.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Meanwhile, the terminology used herein is for the purpose of describing particular implementations only and is not intended to be limiting of the invention. That is, as used herein, the singular forms "a", "an" and "the" are intended to include the plural forms as well, unless the context clearly indicates otherwise.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Also, "exemplary" is merely meant to mean an example, rather than the best. If is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated.

That is, in the drawings, the size and relative sizes of layers, regions and/or other elements may be exaggerated or reduced for clarity. Like numbers refer to like elements throughout and explanations that duplicate one another will be omitted.

Now, the present invention will be described in detail with reference to the accompanying drawings.

Figure 2:
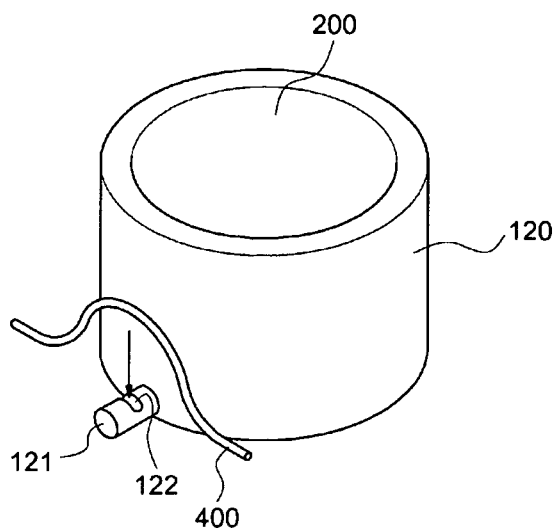
FIG. 2 is a perspective view illustrating a bobbin of a stabilized camera module according to an exemplary embodiment of the present invention.

FIG. 1 is a lateral view illustrating a stabilized camera module according to an exemplary embodiment of the present invention, and FIG. 2 is a perspective view illustrating a bobbin of a stabilized camera module according to an exemplary embodiment of the present invention.

Referring to FIGS. 1 and 2, a stabilized camera module may include a lens assembly (200), first and second springs (300, 301), an actuator (100) and an SMA (Shape Memory Alloy) wire (400).

The actuator (100) may include a cylindrical holder (110), and a cylindrical bobbin (120) inserted into the holder (110) movable along the holder (110) by being inserted into the holder (110), and the lens assembly including a lens is screwed into an inside of the bobbin (120).

Although not shown in the drawings, a coil is wound between the holder (110) and the bobbin (120) to vertically move the bobbin (120) in response to a current that is applied. According to an exemplary embodiment of the present invention, the first and second springs (300, 301) are leaf springs having each center hollowed, and coupled to upper and bottom inner sides of the actuator.

The bobbin (120) is press-fitted into the first and second springs (300, 301), and is prevented from freely moving to an upper side of the actuator (100) by a pressure applied downward of the actuator by the first and second springs (300, 301). The bobbin (120) is formed at one external bottom side with a protruder (121) having a predetermined height, an upper surface of which is formed with a groove unit (122) having a predetermined depth.

The SMA wire (400) is a wire that is elongated when applied with a current, a center of which is positioned at an upper surface of the protruder (121), and is inserted into the groove unit (122) to prevent the protruder (121) from slipping away.

Although not shown in the drawings, a lateral surface of the holder (110) corresponding to the protruder (121) is penetrated, and the bobbin (120) is formed with a slit cut along a position corresponding to a moving path of the protruder (121) so as not to be restricted by the protruder (121) when the bobbin (120) is vertically moved along the holder (110). Furthermore, both ends of the SMA wire (400) are fixedly coupled to an external surface of the holder (110).

Mode for the Invention

Figure 3:
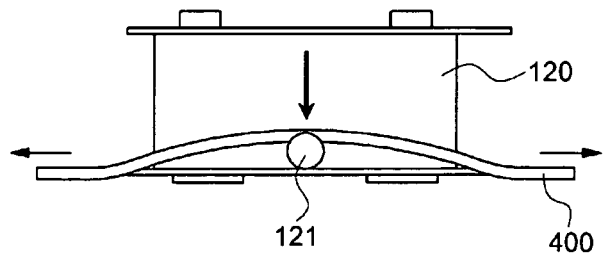
FIG. 3 is an exemplary view illustrating a fixed state of a bobbin.
Figure 4:
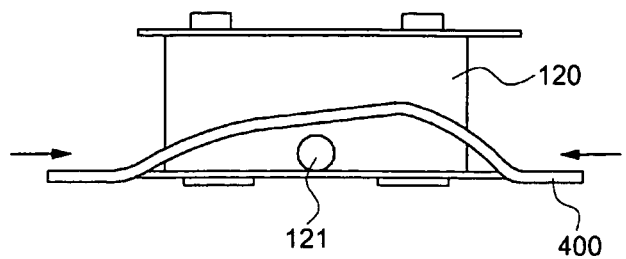
FIG. 4 is an exemplary view illustrating a free state of a bobbin.

FIG. 3 is an exemplary view illustrating a fixed state of a bobbin, and FIG. 4 is an exemplary view illustrating a free state of a bobbin.

Referring to FIG. 3, in a case the camera module maintains an initial state, that is, in a case the lens assembly (200) is fixed at an initial position, a current is applied to the SMA wire (400). As the length of the SMA wire (400) that is applied with the current is shrunken and shortened, the protruder (121) is downwardly applied with a pressure by the SMA wire (400), and as a result, the bobbin (120) integrated with the protruder (121) is also downwardly applied with a pressure.

Subsequently, the bobbin (120) and the first and second springs (300, 301) are downwardly applied with the pressure by the SMA wire (400), such that the bobbin (120) is not moved by the external force to be securely fixed.

In a case the bobbin (120) is moved to adjust a focus with an object or to use a zooming function, as shown in FIG. 4, the power applied to the SMA wire (400) is prevented and the shrunken state of the SMA wire (400) is released to thereby be elongated lengthwise. Therefore, the pressure applied to the protruder (121) is released by the SMA wire (400), and the bobbin (120) is applied with a pressure by the first and second springs (300, 301) only, whereby the bobbin (120) is allowed to freely move in response to the activation of the actuator (100).

According to another exemplary embodiment of the present invention, a plurality of protruders (121), a plurality of slits and a plurality of SMA wires (400) are formed to further fix the bobbin (120).

The stabilized camera module according to the present invention can prevent the bobbin (120) from instable movement by external force during maintenance of initial state to prevent the springs from being deformed, and the springs from generating vibration and noise caused by vibration of a vibration motor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

INDUSTRIAL APPLICABILITY

The present invention has an industrial applicability in that an instable movement of a bobbin caused by outside force can be prevented to thereby improve a camera module.

The invention claimed is:

1. A module comprising:
   a holder formed at a lateral surface with at least one slit;
   a bobbin movably coupled to an inside of the holder and having a protruder protruding outside of the holder by penetrating the slit;
   a lens assembly coupled to an inside of the bobbin and including one or more lenses receiving an optical image of an object;
   one or more elastic members formed between the holder and the bobbin to prevent the bobbin from moving to one side of the holder; and
   an SMA (Shape Memory Alloy) wire extended between the protruder and the holder, and shrunken or relaxed according to the amount of electric power applied to restrict or permit the movement of the protrude by the shrinking or relaxation of the SMA wire, wherein the protrude moves along the slit, and the movement of the protruder is restricted in the same direction as that of restricting the movement of the bobbin by the elastic member,
   wherein both ends of the SMA wire are fixed at the holder and a center part of the SMA wire hangs over the protruder.

2. The camera module of claim 1, wherein a groove unit is formed at the protruder such that the SMA wire is prevented from being deviated from the protruder by insertion of the SMA wire into the groove unit.

3. The camera module of claim 1, wherein the elastic member is a leaf spring.

4. The camera module of claim 1, wherein the elastic member include first and second springs, and the bobbin is coupled by penetrating the first and second springs.

5. The camera module of claim 1, wherein the protruder is formed with a groove unit to accommodate the SMA wire.

6. The camera module of claim 1, wherein the holder takes the shape of a cylinder.

7. A camera module comprising: a holder formed at a lateral surface with at least one slit;
   a bobbin movably coupled to an inside of the holder and having a protrude protruding outside of the holder by penetrating the slit;
   a lens assembly coupled to an inside of the bobbin and including one or more lenses receiving an optical image of an object;
   one or more elastic members formed between the holder and the bobbin to prevent the bobbin from moving to one side of the holder; and
   an SMA (Shape Memory Alloy) wire shrunken or relaxed according to the amount of electric power, applied to restrict or permit the movement of the protruder by the shrinking or relaxation of the SMA wire,
   wherein both ends of the SMA wire are fixed at the holder and a center part of the SMA wire hangs over the protruder.

8. The camera module of claim 7, wherein the elastic member includes first and second springs, and the bobbin is coupled by penetrating the first and second springs.

9. The camera module of claim 8, wherein the holder is formed at a lateral surface with one or more slits, and the bobbin includes a protruder protruding outside of the holder by penetrating the slit.

10. The camera module of claim 7, wherein the protruder is formed with a groove unit such that the SMA wire is prevented from being deviated from the protruder by insertion of the SMA wire into the groove unit.

11. The camera module of claim 7, wherein the protruder is formed with a groove unit to accommodate the SMA.

12. The camera module of claim 7, wherein the protruder moves along the slit, and the movement of the protruder is restricted in the same direction as that of restricting the movement of bobbin by the elastic member.

13. The camera module of claim 7, wherein the elastic member is a leaf spring.

14. The camera module of claim 7, wherein the holder takes the shape of a cylinder.

* * * * *